United States Patent
Miller et al.

(10) Patent No.: US 6,727,664 B2
(45) Date of Patent: *Apr. 27, 2004

(54) PORTABLE FLUORESCENT DROP-LIGHT

(75) Inventors: Thomas J. Miller, Chino Hills, CA (US); Zhou Dong Yue, Guangdong (CN)

(73) Assignee: TMC Enterprises, a division of Tasco Industries, Inc., Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,219

(22) Filed: Dec. 10, 2002

(65) Prior Publication Data

US 2003/0080697 A1 May 1, 2003

Related U.S. Application Data

(63) Continuation of application No. 09/644,765, filed on Aug. 23, 2000, now Pat. No. 6,534,926.
(60) Provisional application No. 60/196,767, filed on Apr. 12, 2000.

(51) Int. Cl.$^7$ .............................................. H05B 37/02
(52) U.S. Cl. .................. 315/224; 315/209 R; 362/260; 362/223
(58) Field of Search ............................. 315/224, 209 R, 315/225, 178, 180, 182, 313, 320, 323, 33, 35, 38; 362/260, 223, 222, 225, 217

(56) References Cited

U.S. PATENT DOCUMENTS

| | | | |
|---|---|---|---|
| 4,109,307 A | 8/1978 | Knoll | 315/224 |
| 4,127,893 A | 11/1978 | Goepel | 363/37 |
| 4,277,726 A * | 7/1981 | Burke | 315/307 |
| 4,791,338 A | 12/1988 | Dean et al. | 315/209 R |
| 4,928,038 A | 5/1990 | Nerone | 315/209 R |
| 5,049,783 A | 9/1991 | Kroening | 315/102 |
| 5,068,577 A | 11/1991 | Brown | 315/307 |
| 5,072,159 A | 12/1991 | Schlenk | 315/278 |
| 5,088,015 A * | 2/1992 | Baggio et al. | 362/217 |
| 5,301,093 A * | 4/1994 | Baggio | 362/223 |
| 5,493,482 A * | 2/1996 | Bowen | 362/219 |
| 5,500,792 A | 3/1996 | Jeon et al. | 315/291 |
| 5,519,289 A * | 5/1996 | Katyl et al. | 315/209 R |
| 5,528,477 A * | 6/1996 | Carmo | 362/260 |
| 5,537,010 A | 7/1996 | Johnson et al. | 315/289 |
| 5,635,799 A * | 6/1997 | Hesterman | 315/127 |
| 5,848,836 A * | 12/1998 | Graber et al. | 362/223 |
| 5,854,538 A | 12/1998 | Krummel | 315/105 |
| 5,998,930 A | 12/1999 | Upadhyay et al. | 315/106 |
| 6,031,339 A | 2/2000 | Andrews | 315/224 |
| 6,169,373 B1 * | 1/2001 | Riesinger | 315/178 |
| 6,534,926 B1 * | 3/2003 | Miller et al. | 315/224 |

* cited by examiner

Primary Examiner—James Clinger
Assistant Examiner—Ephrem Alemu
(74) Attorney, Agent, or Firm—Knobbe, Martens, Olson & Bear, LLP

(57) ABSTRACT

A hand-held fluorescent lamp assembly powered by typical line supply of 120 VAC, 60 Hz via an attached power cord and employing multiple commonly available fluorescent lamps. The assembly includes switches to independently control the multiple fluorescent lamps. The assembly includes lightweight solid state power regulation components. The power regulation circuit employs a self-oscillating circuit that is approximately matched in frequency of oscillation to the natural frequency of the fluorescent lamp load to automatically ignite the fluorescent lamps. The power regulation circuit includes circuit elements to automatically protect the ballast circuit and lamps from overdrawing in the run state and from abnormal load conditions.

7 Claims, 5 Drawing Sheets

PORTABLE FLUORESCENT DROP-LIGHT

RELATED APPLICATIONS

This application is a continuation of application Ser. No. 09/644,765, filed Aug. 23, 2000 now U.S. Pat. No. 6,534,926 which claims the benefit of U.S. Provisional Application No. 60/196,767 entitled Portable Fluorescent Drop-Light filed Apr. 12, 2000.

BACKGROUND OF THE INVENTION

1. Field of the Invention

The present invention relates to the field of electrical devices and in particular to a portable fluorescent drop-light including multiple lamps connected in parallel with switches to allow the individual lamps to be independently turned on or off and a ballast circuit comprising solid-state devices to drive and protect the multiple lamps with or without integral starters.

2. Description of the Related Art

Circumstances often arise around the home and in shops in which a person wishes to illuminate an area that is not adequately illuminated by the installed light fixtures. Flashlights are sometimes used in these circumstances, however as they are powered by batteries, they typically do not offer the illuminating power of hardwired lights. In addition the batteries are of limited lifespan and the light from a flashlight is typically focussed whereas the desire is often for more diffused illumination.

Drop-lights are powered by line supply (120 VAC, 60 Hz) but are portable, hand-held assemblies to thereby allow the user to provide light where the installed light fixtures do not provide coverage. Drop-lights are powered from wall receptacles via a power cord and are not subject to the power and life span limitations of batteries. Drop-lights are typically provided with a hook to allow them to be hung in position and typically employ an incandescent light bulb to provide the illumination.

Incandescent light bulbs consist of a glass bulb enclosing a tungsten filament in an inert gas or highly evacuated atmosphere. When an electric current passes through the filament, the filament heats up to a high temperature at which point it becomes incandescent and provides illumination. The atmosphere surrounding the filament is either an inert gas or evacuated to near vacuum in order to minimize deleterious reactions of the tungsten filament at elevated operating temperatures. Tungsten is used because it has an extremely high melting point and can maintain the high temperatures necessary for incandescence with minimal deterioration.

Incandescent light bulbs are a well-developed technology and are economical to purchase. However, incandescent light bulbs are not particularly economical to operate. Incandescent light bulbs are not very efficient at converting electrical energy to light energy. A typical incandescent lamp produces approximately 20 lumens per watt of electrical power consumed. Much of the electrical energy is converted to heat. The tungsten filament in a typical incandescent bulb operates at approximately 1500–2700K. A 75–100W incandescent bulb will get too hot to touch during operation.

The high operating temperatures of incandescent light bulbs present some particular drawbacks when used in drop-lights. The heat emitted by the bulb itself makes them uncomfortable to have in close proximity to a person for an extended period. Also, the high operating temperature and fine structure of the tungsten filaments makes them susceptible to breaking if they are jarred in use. Since a drop-light is portable, users will generally move them about during use to place them in the optimal position for illuminating their work. This movement while the filament is hot stresses the filament and an incandescent light bulb in a drop-light will generally have a much shorter life span than it would in a stationary light fixture. Finally, the bulb enclosure is typically a thin glass bulb susceptible to breakage and, if the bulb breaks, the hot tungsten filament is exposed. It can be easily appreciated that this could present an extreme fire hazard if the user is working around flammable materials with relatively low flash points.

Gas discharge lamps are an alternative means of converting electrical energy to light energy that offer significant advantages to incandescent lighting, particularly in drop-light applications. Gas discharge or fluorescent lamps, consist of a gas or vapor filled tube that is provided with electrodes at either end of the tube. When a high enough voltage is applied between the electrodes, the gas inside the tube partially ionizes and undergoes a phase change to the plasma state. The plasma state gas is conductive and serves as a conductor for an electric arc between the electrodes. As current passes between the electrodes, electrons collide with gas molecules within the tube. When an electron collides with a gas atom, an electron in the atom's shell is boosted to a higher energy level. This higher energy level is not a stable condition and when the electron falls back to its normal energy level, a photon of light is emitted. Thus the gas luminesces and gives off the characteristic "fluorescent" light.

Fluorescent lights convert more of the supplied electrical energy to light energy than incandescent lights do and fluorescent lights operate at lower external temperatures. The light emitting medium in fluorescent lights is a gas that cannot "break" like the thin tungsten filament in an incandescent light bulb. While a broken fluorescent light tube does present some health hazards, there is not the tungsten filament operating at 1500–2700K to present an ignition source for flammable materials.

Typically, a higher voltage is required to initiate the plasma state than is required to maintain the plasma state and the luminescence. Also, once the gas starts becoming a plasma, the effective resistance between the electrodes becomes negative. More of the gas will become plasma and the fluorescent light tube will tend to draw more and more current even though the applied voltage stays the same. If this phenomenon is allowed to continue unabated, the tube will overdraw and burn itself out. The excessive current draw can also damage the supply circuit.

Typical practice in the art is to provide a damping circuit that can function both to "spark" the gas tube into operation and also to limit the current that is supplied to the tube. This damping has typically been accomplished with a ballast that primarily consists of a large transformer/inductor. The ballast functions both to transform the supplied line voltage (which is an AC voltage) to a high enough potential to ensure that the fluorescent tube "lights off" and also to provide a high enough inductance in the supply circuit to prevent the fluorescent light tube from overdrawing and damaging itself or the supply circuit during operation.

Alternatively, fluorescent bulbs are available that include integral "starting" ability. The ballast circuits for such lamps provide an appropriate voltage to the lamps and the lamps start themselves. The ballast circuit then regulates the current draw in a similar manner to that previously described for non-self starting bulbs.

The requirements of a ballast for typical line supplies (120 VAC, 60 Hz) are such that the wire gauge and number of turns in the coils and size of the magnetic coupling core result in ballast's that are relatively bulky and heavy. To overcome the size and weight issue, previous art has been developed that incorporates solid state devices into circuit designs to allow similar ballasting functions to be performed in much more compact and lighter assemblies. This has enabled lightweight hand-held fluorescent drop-lights to be brought to market.

The typical design for hand-held fluorescent drop-lights powered by line supplies uses either a twin tube standard bulb or a quad tube standard bulb. The twin tubes have the advantage that they are less expensive and more readily available. However, the twin tubes are of approximately half the power (13W) and light output of the quad tube lamps. The quad tube design offers approximately twice the power (27W) and illumination of a single twin tube, however the quad tube bulb is more expensive to produce and purchase and is not as readily available. The size and weight restrictions of drop-light applications generally preclude employing multiple independent lamp circuits as the additional ballast circuits required for each lamp occupy too much space and are too heavy to make such a drop-light handy in use.

From the foregoing, it can be seen that there is a continuing need for a portable hand-held lamp that is efficient to operate and does not operate at excessively high temperatures. The lamp should be sturdy and durable and replacement bulbs should be inexpensive and readily available. It would be a further desirable feature to provide variable illumination and as light-weight and compact a lamp as possible.

SUMMARY OF THE INVENTION

The aforementioned needs are satisfied by the present invention, which in one embodiment, is a portable fluorescent drop-light that employs a single self-oscillation circuit to power two fluorescent light bulbs in parallel. The invention further comprises a single protection circuit for both bulbs. By placing the two bulbs in parallel, the drop-light will function with either bulb alone or with both together, yet maintains the weight and size advantages of using a single set of circuit components to ballast both bulbs. The drop-light incorporates solid state devices in the ballast circuit to reduce the weight of the portable fluorescent drop-light compared to similar lights using traditional ballasts. The advantage of having two bulbs is that this design provides additional light while still using commonly available and inexpensive twin-tube standard bulbs. In addition, the drop-light is provided with switches so that the user can turn on only one of the bulbs when not as much light is needed thereby conserving energy. These and other objects and advantages of the present invention will become more fully apparent from the following description taken in conjunction with the accompanying drawings.

DETAILED DESCRIPTION OF THE PREFERRED EMBODIMENT

Figure 1A:
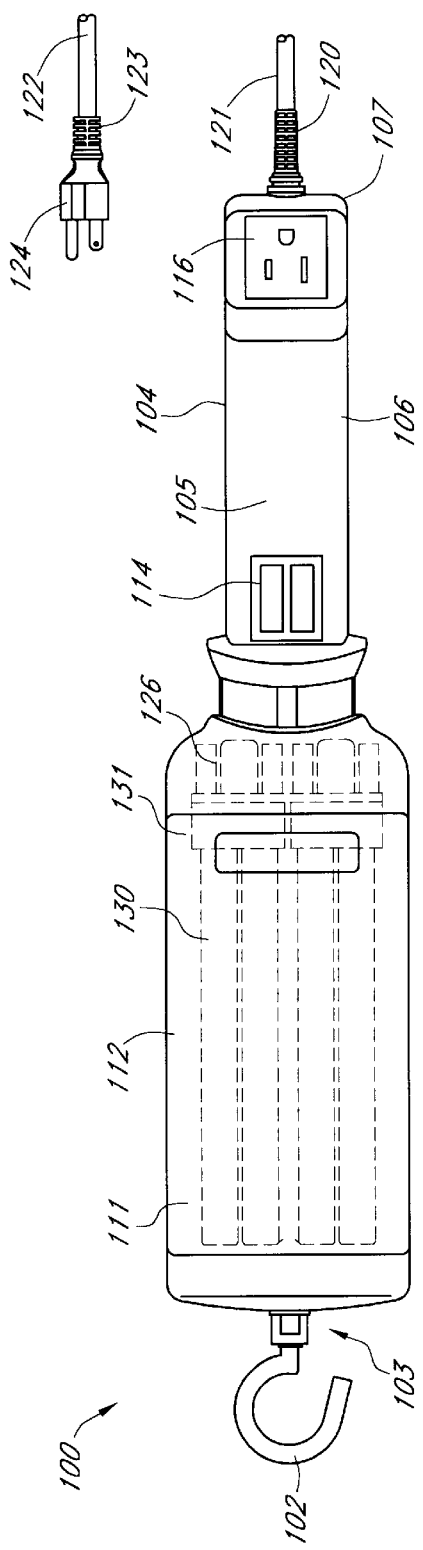
FIG. 1A shows a top view of an assembled portable fluorescent drop-light.

Reference will now be made to the drawings wherein like numerals refer to like parts throughout. A portable fluorescent drop-light 100 is shown in a top view in FIG. 1A and in a side view in FIG. 1B. The portable fluorescent drop-light 100 provides hand-held portable illumination around a home, office, or shop. The portable fluorescent drop-light 100 draws electrical power from a typical wall receptacle and converts the electrical energy to light energy in a manner that will be described in greater detail below. The portable fluorescent drop-light 100 is approximately 1 kg in mass and 30 cm in length.

The portable fluorescent drop-light 100 comprises a hook 102. The hook 102 is preferably made of a light-weight strong plastic material of a type well known in the art. The hook 102 is fixedly attached to a first end 103 of a right enclosure shell 104 and a left enclosure shell 106 so as to be rotatably moved about an axis. The hook 102 allows the portable fluorescent drop-light 100 to be hung from other objects thereby allowing a user to free their hands for other tasks.

The right 104 and left 106 enclosure shells are preferably made of a light-weight strong plastic material of a type well known in the art. The right 104 and left 106 enclosure shells are substantially mirror images of each other. The right 104 and left 106 enclosure shells are provided with a plurality of support structures extending outwards from their inner surface to allow the right 104 and left 106 enclosure shells to secure and locate other component parts of the portable fluorescent drop-light 100 in a manner that will be described in greater detail below. The outsides of the right 104 and left 106 enclosure shells also provide a gripping surface 105 adjacent a second end 107 for a user of the portable fluorescent drop-light 100. The gripping surface 105 of this embodiment is generally cylindrical and is approximately 10 cm×5 cm×4 cm. The gripping surface 105 of the right 104 and left 106 enclosure shells encloses a ballast circuit assembly 140 in a manner that will be described in greater detail below.

The portable fluorescent drop-light 100 also defines a lamp cavity 111, which is covered by a lens 112. The lamp cavity 111 is adjacent the first end 103 and is adapted to receive a plurality of fluorescent lamps 130, 150 in the manner shown. The lens 112 is transparent plastic that is configured to closely mate with the right 104 and left 106 enclosure shells in a manner that will be described in greater detail below. The lens 112 covers and protects fluorescent lamps 130, 150 from impact, dirt, and other contamination. The fluorescent lamps 130 of this embodiment are twin tube, 13W PL lamps of type FL-26 available from numerous suppliers, such as Phillips, and provide illumination when supplied with regulated electrical power in a well known manner.

The portable fluorescent drop-light 100 of this embodiment also comprises a switch 114 that is held in place between the right 104 and left 106 enclosure shells so as to be interposed between the gripping surface 105 and the cavity 111 in the manner shown. The switch 114 is a two pole electrical switch rated for at least 12A at 125 VAC of a type well known in the art. The switch 114 selectively provides regulated electrical power from a ballast circuit 132, 152 to the fluorescent lamps 130, 150 in a manner that will be described in greater detail below.

The portable fluorescent drop-light 100 also comprises an electrical outlet 116 that is held in place between the second end 107 of the right 104 and left 106 enclosure shells and that is adapted to receive a standard 3 prong grounded plug. The electrical outlet 116 is rated for 15A at 125 VAC and in this embodiment is a type RF-6001 available from Rongfeng of China. The electrical outlet 116 makes the electrical power supplied to the portable fluorescent drop-light 100 available to other devices that can be connected to the electrical outlet 116 in a manner well known in the art.

The portable fluorescent drop-light 100 also comprises a strain relief 120, a power cord 122, and a plug 124. The strain relief 120 is fixedly attached to the second end 107 of the right 104 and left 106 enclosure shells in a manner that will be described in greater detail below and also fixedly attached to a first end 121 of the power cord 122 in a well known manner. The strain relief 120 alleviates tensile and lateral forces that arise between the power cord 122 and the right 104 and left 106 enclosure shells due to movement of the portable fluorescent drop-light 100 during use. The power cord 122 is a three twisted conductor 16 AWG power cable of a type well known in the art. The plug 124 is a grounded three prong male connector of a type well known in the art. The plug 124 is physically and electrically connected to a second end 123 of the power cord 122 in a well known manner. The first end 121 of the power cord 122 is physically and electrically connected to the electrical outlet 116 and to the ballast circuit 132. Thus, electrical power supplied to the plug 124 is also supplied to the electrical outlet 116 and to the ballast circuit 132, 152 via the power cord 122.

A first end 131 of the fluorescent lamps 130, 150 is connected to a bulb socket 126. The bulb socket 126 is adapted to physically and electrically connect to the first end 131 of the fluorescent lamps 130, 150 in a well known manner. The bulb socket 126 also physically locates the fluorescent lamps 130, 150 within the lamp cavity 111 and supplies them with regulated electrical power in a manner that will be described in greater detail below.

Figure 1B:
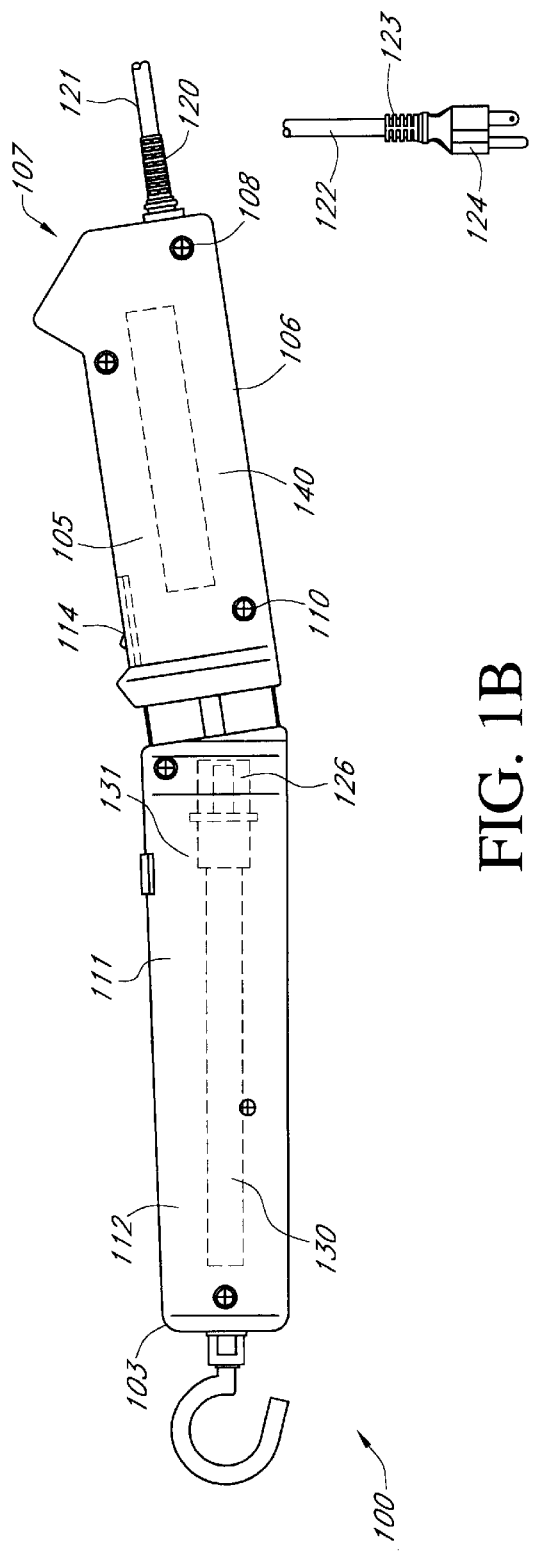
FIG. 1B shows a side view of an assembled portable fluorescent drop-light.
Figure 2:
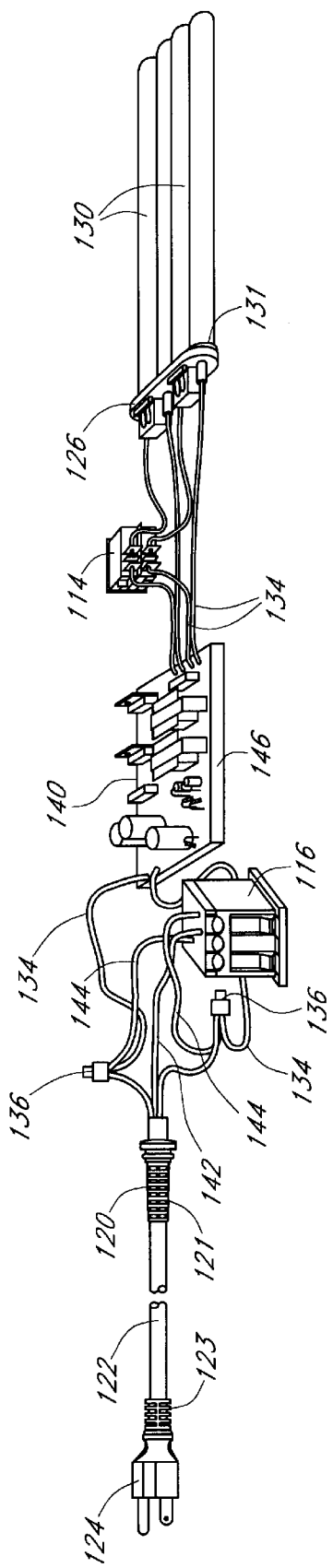
FIG. 2 is a perspective view of the assembled electrical components of the portable fluorescent drop-light.

The portable fluorescent drop-light 100 also comprises a ballast circuit assembly 140 located with the right 104 and left 106 enclosure shells adjacent the gripping surface 105 as shown in FIG. 1B in dashed lines. The ballast circuit assembly 140 comprises a circuit board 146 and the ballast circuit 132, 152 mounted thereon as shown in FIG. 2. The circuit board 146 is approximately a 1" by 1.5" by 2.7" piece of non-conducting rigid material and serves as a mounting surface for the various components of the ballast circuit 132. The proper material of the circuit board 146 and manner of mounting electrical components thereon are both well known to those skilled in the art. The ballast circuit 132, 152 receives electrical power from the power cord 122 and provides regulated electrical power to the fluorescent lamps 130, 150 in a manner that will be described in greater detail below.

The ballast circuit assembly 140, bulb socket 126, fluorescent lamps 130, 150, power cord 122, strain relief 120, electrical outlet 116, switch 114, lens 112, and hook 102 are all placed adjacent the inner surfaces of the right 104 and left 106 enclosure shells such that each of the listed items is adjacent a corresponding support structure such as have been previously described. The right enclosure shell 104 is positioned so as to be adjacent and respectively aligned with the left enclosure shell 106. Screws 110 are then positioned in attachment holes 108 provided in the right 104 and left 106 enclosure shells and tightened in a well known manner so as to secure the right enclosure shell 104 to the left enclosure shell 106 and thereby locate and secure the other components of the portable fluorescent drop-light 100 within the right 104 and left 106 enclosure shells in the locations previously described.

FIG. 2 shows a perspective view of the electrical components of the portable fluorescent drop-light 100. In the preferred embodiment, these components would be assembled together before being placed within the right 104 and left 106 enclosure shells as previously described. As shown in FIG. 2, a first end 121 of the power cord 122 is connected to the plug 124 and a second end 123 of the power cord 122 is connected to the strain relief 120. A ground wire 142 of the power cord 122 is connected to the ground terminal of the electrical outlet 116 in a well known manner. The ground wire 142 grounds the portable fluorescent drop-light 100 in a manner well known in the art.

The conducting wires of the power cord 122 are connected to the ballast circuit assembly 140 via 18 AWG wire 134 and closed end connectors 136 in a manner well known in the art. The conducting wires of the power cord 122 are further connected to the corresponding terminals of the electrical outlet 116 via 14 AWG wire 144 and closed end connectors 136 in a well known manner. Thus, when the plug 124 is supplied with electrical power, the ballast circuit 132, 152 and electrical outlet 116 are also supplied with electrical power via the power cord 122 and the 18 AWG 134 and 14 AWG 144 wire.

The ballast circuit 132, 152 regulates the electrical power received via the 18 AWG wire 134 in a manner that will be described in greater detail below. In this embodiment, the ballast circuit 132, 152 selectively provides this regulated power to the bulb socket 126 and thus to the fluorescent lamps 130, 150 via 18 AWG wire 134 and the switch 114. Regulated power may be selectively provided to the bulb socket 126 and the fluorescent lamps 130, 150 by user actuation of the switch 114. The switch 114 is a two-pole switch and is connected such that a user can select to supply regulated power to each fluorescent lamp 130, 150 independently.

Figure 3:
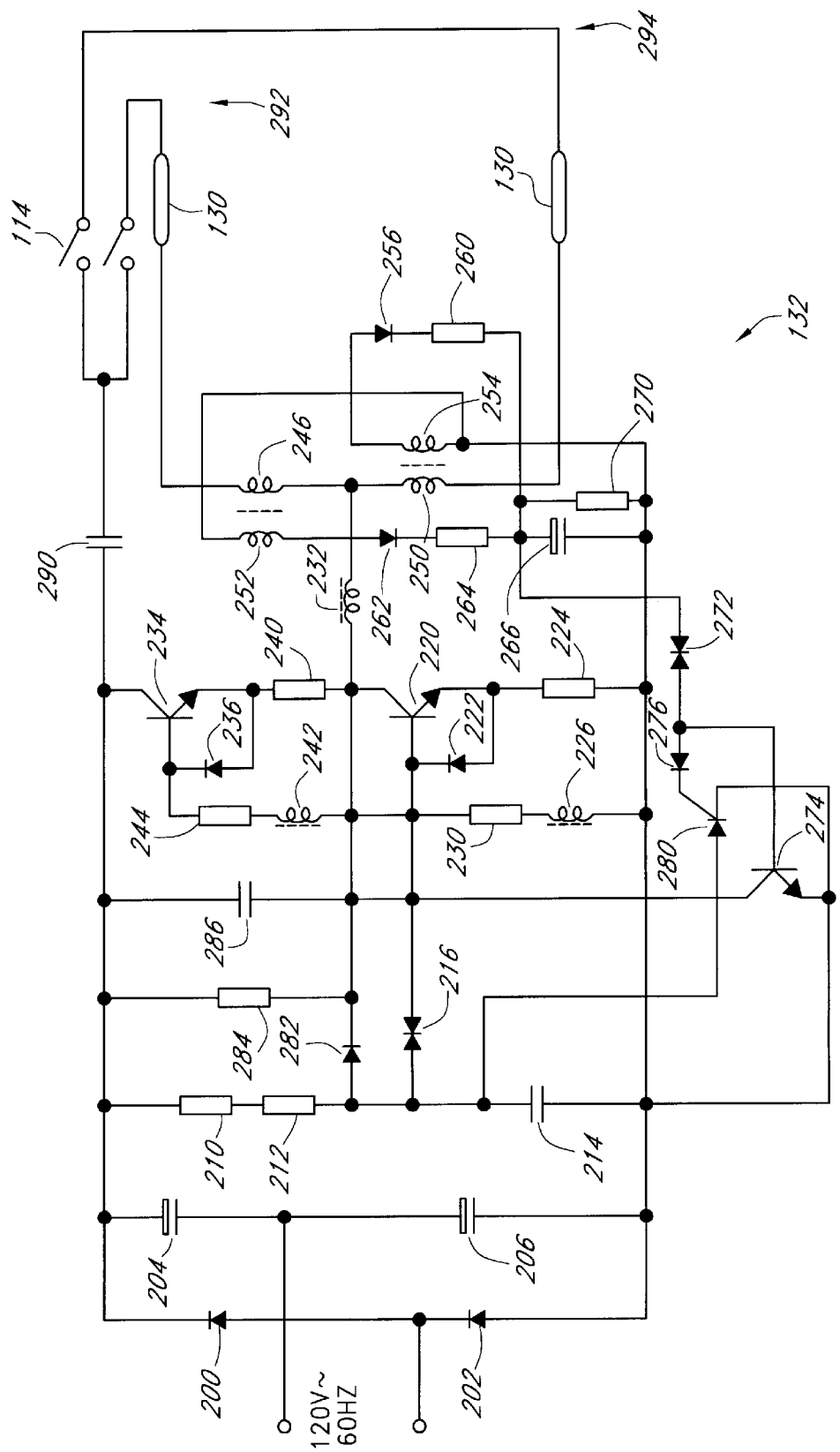
FIG. 3 is a circuit diagram of a ballast circuit for the portable fluorescent drop-light suitable for non-self-starting lamps.

One embodiment of the ballast circuit 132 is shown in FIG. 3, wherein the ballast circuit 132 receives line supply, normally 120 VAC, 60 Hz. The embodiment of the ballast circuit 132 shown in FIG. 3 and described as follows is adapted for use with fluorescent lamps 130 without integral starter elements. Diodes 200 and 202 and capacitors 204 and 206 full-wave rectify, filter, and direct the input current through resistors 210 and 212 to charge capacitor 214. When sufficient charge accumulates on the capacitor 214 to exceed the breakdown voltage of bi-directional diode 216, the bi-directional diode 216 breaks down and passes current to the base of transistor 220 thereby forward biasing the emitter-base junction of the transistor 220 and also passes current through resistor 230 and inductor 226. Transistor 274 forms part of a protection circuit and is normally cut-off as will be described in greater detail below. Diode 222 is connected between the emitter and base of transistor 220 to limit the reverse biasing of the emitter-base junction and thus the emitter-base junction depletion capacitance thus allowing transistor 220 to turn on more rapidly.

The collector voltage of transistor 220 is held at or above the base voltage of transistor 220 by forward-biased diode 282, thus the collector-base junction of transistor 220 is reverse biased and the transistor 220 is in the active mode of operation. The collector of the transistor 220 in the active mode rapidly draws off accumulated charge from the capacitor 214 via the forward biased diode 282 and passes it through resistor 224. When sufficient charge has been removed from the capacitor 214, the voltage across the capacitor 214 falls below the breakdown voltage of the bi-directional diode 216 and the bi-directional diode 216 recovers its blocking state and ceases passing current. The cessation of current to the base of transistor 220 cuts off the transistor 220, thereby allowing charge to accumulate again on capacitor 214. It can be appreciated that the capacitor 214 and the transistor 220 operate in opposition via the bi-directional diode 216.

A circuit loop 292 is formed by capacitor 204, capacitor 290, the closed switch 114, a fluorescent lamp 130, inductor 246, inductor 232, the collector and emitter legs of transistor 220, resistor 224, and diode 202 with the line supply. In a similar manner, a substantially parallel circuit loop 294 is formed by a fluorescent lamp 130 and inductor 250. It should be noted that the two circuit loops 292, 294 with the fluorescent lamps 130 share common circuit elements except the parallel branches of the fluorescent lamps 130 and their associated inductors 246 or 250.

As the line supply drives current through the circuit loops 292 and 294, inductor 232 saturates, the voltage across inductor 226 falls, which pulls down the base voltage of transistor 220 until the point at which transistor 220 enters cut-off. Transistor 220 cutting off directs the current in inductor 232 through inductor 242, which further passes through resistor 244 to the base of transistor 234. This base current forward biases the emitter-base junction of transistor 234 and the transistor 234 enters the active mode of operation and passes emitter current through resistor 240. Diode 236 is connected between the emitter and base of transistor 234 to limit the reverse biasing of the emitter-base junction and thus the emitter-base junction depletion capacitance thus allowing transistor 234 to turn on more rapidly. Resistor 284 connects the collector of transistor 234 to diode 282. The additional collector current of transistor 234 in the active mode accumulates additional charge on capacitor 290 and the voltage on capacitor 290 increases above the line supply voltage.

As transistor 234 is becoming active, capacitor 286 discharges and the current flows through capacitor 286, capacitor 290, the fluorescent lamps 130, inductors 246 and/or 250, and inductor 232. As capacitor 286 discharges, capacitor 214 charges until the point where sufficient charge accumulates on capacitor 214 to return the transistor 220 to the active mode of operation as previously described and to cut off transistor 234. This alternation between active mode operation and cut-off of the transistors 220 and 234 provides a self-oscillation circuit, which is adjusted by component selection to have a natural frequency that, in this embodiment, is approximately 37 kHz.

The series connection of the capacitor 290, the inductors 246 and/or 250, the reactance of the fluorescent lamps 130 (primarily capacitive), and inductor 232 also form an oscillating circuit element with a natural frequency that, in this embodiment, is approximately 37 kHz. The close match in oscillation frequencies between the load branch and the self-oscillation circuits of transistors 220 and 234 provides charging of capacitor 290 to voltages much higher than those provided by the line supply. This high voltage on capacitor 290 initiates a plasma state within the fluorescent lamps 130 and places them in a run condition automatically, without requiring any special user action. The reactance of the fluorescent lamps 130 decreases when they enter the run condition and accordingly a limiting/protection circuit is provided.

Inductor 252 which is coupled to the inductor 246 and/or inductor 254 which is coupled to the inductor 250 generate voltages which drives current through diode 262 and resistor 264 and/or diode 256 and resistor 260. This induced current charges capacitor 266. A resistor 270 is connected in parallel to the capacitor 266 as a bypass. When the accumulated charge on the capacitor 266 exceeds the breakdown voltage of bi-directional diode 272, the bi-directional diode 272 breaks down and passes current to the base of transistor 274, thereby forward biasing the emitter-base junction. Transistor 274 becomes active and bleeds off current from the base of transistor 220, which cuts off transistor 220 and terminates the self-oscillation previously described.

The current passing through bi-directional diode 272 also forward biases diode 276 and injects current into the gate of thyristor 280. This injected gate current places the thyristor 280 into an on state and allows the thyristor 280 to pass forward current and drain off the charge accumulated on capacitor 214 which removes the potential to inject current into the base of transistor 220 which also inhibits the self-oscillation previously described. It can be appreciated that the charging of capacitor 266 to the breakdown voltage of the bi-directional diode 272 before activating the protection circuitry permits a limited degree of imbalance between the loads or other abnormal load conditions without disabling the ballast circuit 132. In this embodiment, the protection circuit is activated for a portion of each oscillation cycle so as to allow the ballast circuit 132 to provide both the high voltage required to place the fluorescent lamps 130 into a run condition in the manner previously described, yet also inhibit the fluorescent lamps 130 from overdrawing and damaging themselves or the ballast circuit 132 as they enter the run condition.

It can be appreciated by one skilled in the art that the singular circuit elements of the ballast circuit 132 herein described supplying multiple fluorescent lamps 130 reduces the number of circuit elements necessary for the ballast circuit 132 of this embodiment. By reducing the number of circuit elements needed, the ballast circuit assembly 140 comprising the ballast circuit 132 is advantageously reduced in size so as to readily fit within the right 104 and left 106 enclosure shells in the manner previously described. Thus, the portable fluorescent drop-light 100 of this embodiment can be readily held in the hand and easily positioned by one of normal size and ability.

Figure 4:
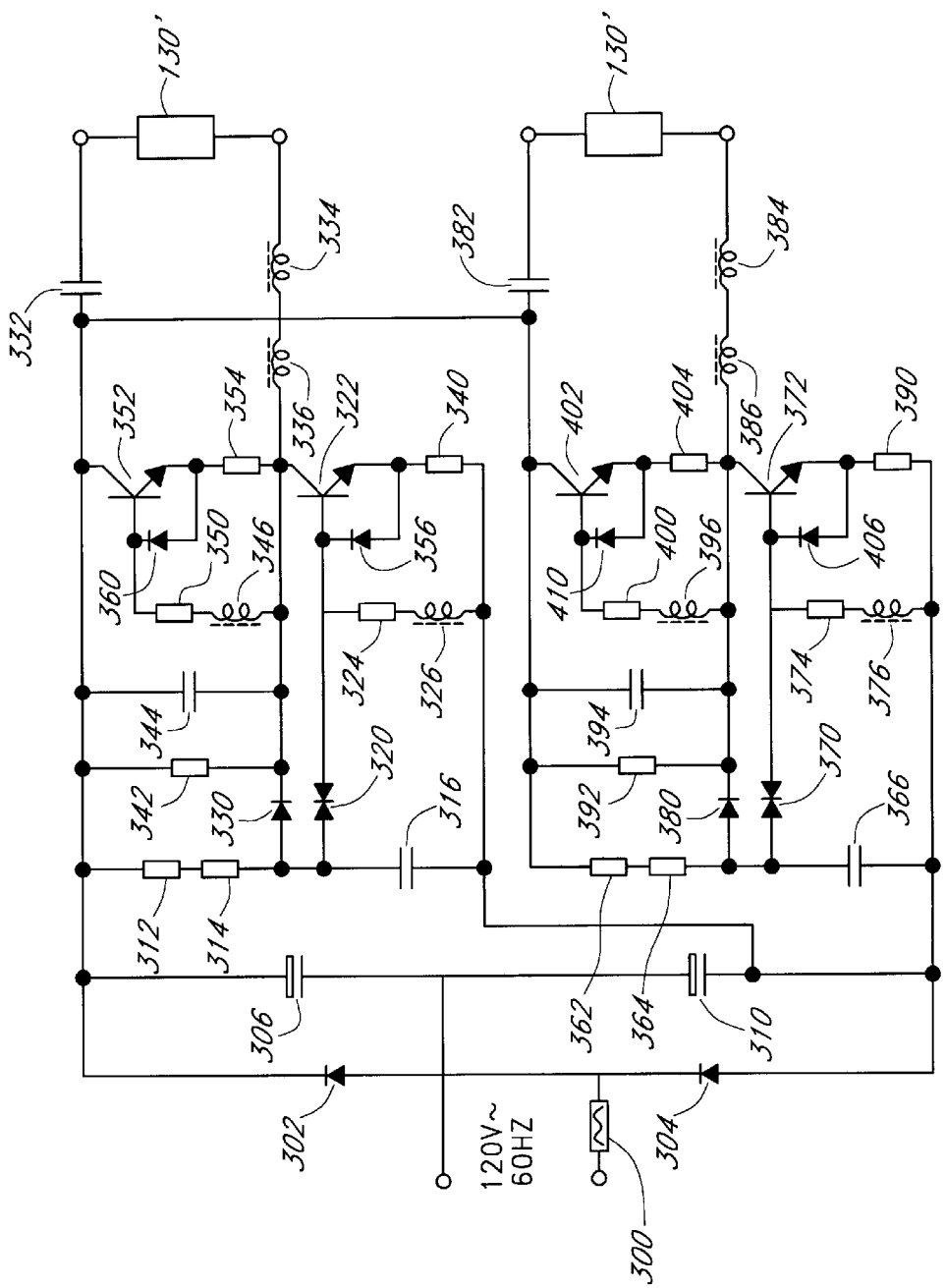
FIG. 4 is a circuit diagram of an alternative embodiment of a ballast circuit for the portable fluorescent drop-light suitable for self-starting lamps.

FIG. 4 shows an alternative embodiment of a ballast circuit 152. The ballast circuit 152 as shown in FIG. 4 and described as follows provides regulated electrical power to fluorescent lamps 150 that include an integral starter element. The ballast circuit 152 receives line supply, normally 120 VAC, 60 Hz. Fuse 300 and diodes 302 and 304 and capacitors 306 and 310 full-wave rectify, filter, and direct the input current through resistors 312 and 314 to charge capacitor 316. When sufficient charge accumulates on the capacitor 316 to exceed the breakdown voltage of bi-directional diode 320, the bi-directional diode 320 breaks down and passes current to the base of transistor 322 thereby forward biasing the emitter-base junction of the transistor 322. Current also passes through resistor 324 and inductor 326. Diode 356 is connected between the base and emitter of transistor 322 in order to limit the reverse bias on the base-emitter junction of transistor 322 to thereby allow the transistor to turn on more rapidly. The collector of transistor 322 is held at a higher voltage than the base by forward biased diode 330 and thus transistor 322 is in the active mode of operation. While transistor 322 is in the active mode of operation, a transistor 352 is cut-off.

When the transistor 322 goes active, current starts to flow with a high initial di/dt in the circuit branch comprising capacitors 306 and 332, fluorescent lamp 150, inductors 334 and 336, transistors 322, resistor 340, diode 304, and fuse 300. The current flow causes capacitor 322, fluorescent lamp 150, and inductors 334 and 336 to saturate which causes the di/dt to decrease. As di/dt decreases, the voltage across inductors 334 and 336 decreases which decreases the voltage at the collector of transistor 322 and transistor 322 enters saturation, while the voltage across capacitor 332 reaches higher voltages than line supply. The current flowing in the circuit branch then reverses through resistor 342 and capacitor 344 as well as through inductor 346 and resistor 350 to trigger the base of transistor 352. Transistor 352 enters the active mode of operation. A diode 360 is connected between the base and emitter of transistor 352 to limit the reverse bias on the base-emitter junction of transistor 352 and thereby allow transistor 352 to turn on more rapidly. Transistor 352 entering the active mode of operation is accompanied by transistor 322 becoming cut-off as the current flow reverses as previously described.

The circuit branches containing transistors 322 and 352 alternate between operation in the cut-off and active modes. The alternation between transistors 322 and 352 has a natural frequency which is approximately equal to the natural frequency of the series connection of the capacitor 332, the fluorescent lamp 150 and inductors 334 and 336 wherein the frequencies of these oscillations are approximately equal and in this embodiment approximately 35 kHz. The oscillating current flow induces high voltage to appear on capacitor 332. Since capacitor 332 is connected to the fluorescent lamp 150, the high voltage produced provides the ignition voltage necessary to activate starter elements 154 in the fluorescent lamps 150 in a manner that will be described in greater detail below with reference to FIG. 5. Thus, the ballast circuit 152 of this embodiment also automatically starts the fluorescent lamps 150 without any special user action.

The ballast circuit 152 also comprises a parallel, substantially identical circuit comprising resistors 362 and 364, capacitor 366, bi-directional diode 370, transistor 372, resistor 374, inductor 376, diode 380, capacitor 382, inductors 384 and 386, resistors 390 and 392, capacitor 394, inductor 396, resistor 400, transistor 402, resistor 404, and diodes 406, 410. The placement, characteristics, and operation of these components are substantially identical to those for the corresponding components in the parallel circuit as previously described and will not be repeated here. It should be appreciated that the parallel circuits herein described are also selectively activated by user actuation of the switch 114 in the manner previously described for the embodiment of the ballast circuit 132 described with reference to FIG. 3.

The ballast circuit 152 of this embodiment suitable for self-starter lamps 150, while employing more circuit elements (45 total) than the ballast circuit 132 of the embodiment previously described suitable for non-self-starter lamps 130 (38 total), retains a desirably low overall size and weight, which in this embodiment is approximately 1" by 1.5" by 2.7", by dispensing with some of the bulkier and more massive circuit elements of the ballast circuit 132 of the embodiment suitable for use with non-self-starter lamps 130. In particular, the ballast circuit 152 of this embodiment dispenses with inductors 232, 250 and 254, and 252 and 246 of the ballast circuit 132 of the previous embodiment. Inductors 250 and 254 share a common core as do inductors 252 and 246 and are relatively bulky and massive components as will be appreciated by those skilled in the art. Inductors 334 and 336 and 384 and 386 perform similar circuit functions to the bulkier and more massive inductors 232, 250 and 254, and 252 and 246. Thus, the ballast circuit 152 of this embodiment is able to have essentially the same functionality of the ballast circuit 132 of the previous embodiment as previously described with more circuit elements while retaining substantially the same overall size and weight.

Figure 5:
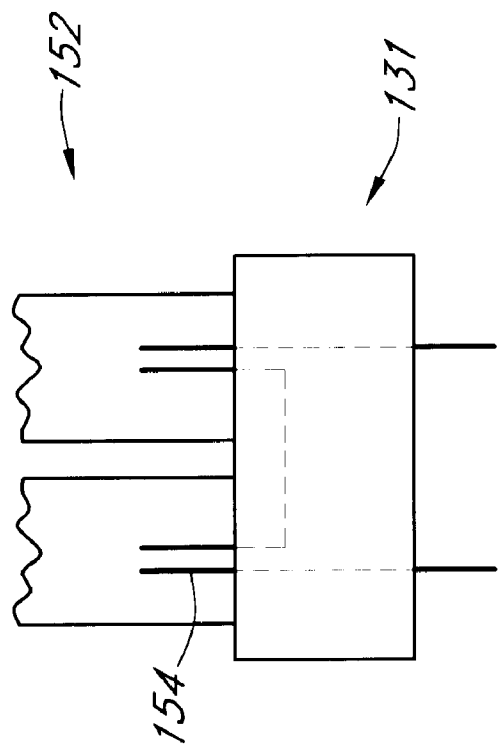
FIG. 5 is a section view of the starter elements of a self-starting fluorescent lamp.

The fluorescent lamps 150 with integral starters comprise starter elements 154 as shown in FIG. 5. The starter elements 154 of this embodiment comprise a plurality of flexible bi-metallic elongate strips that are placed in proximity so as to form capacitors in a well known manner. When the ballast circuit 152 first begins to supply the regulated electrical power to the fluorescent lamps 150 in the manner previously described, such as initially turning on the portable fluorescent drop-light 100, the fluorescent lamps 150 are not in a run condition. However, the regulated electrical power provided to the fluorescent lamps 150 is thereby provided to the starter elements 154. The current alternately flowing through the starter elements 154 will create alternating electric fields between adjacent starter element 154 strips as the current flows through the material of the starter elements 154. The starter elements 154 are constructed of conductive material such that the current passing through the starter elements 154 will result in bulk resistive heating of the starter elements 154. The starter elements 154 are further constructed such that the resistive heating of the starter elements 154 causes adjacent starter elements 154 to deflect closer together such that the air gap between adjacent starter elements is reduced. As the air gap between adjacent starter elements is reduced, the regulated current supplied by the ballast circuit 152 will arc across the air gap. As current arcs across the starter elements 154 while regulated power is being supplied to the fluorescent lamps 150 in the manner previously described, the fluorescent lamps 150 will enter a run condition in a well known manner.

As the fluorescent lamps 150 enter a run condition, the electrical impedance of the fluorescent lamps 150 decreases in a known manner. The reduced impedance of the fluorescent lamps 150 results in substantially less current passing through the starter elements 154 and the starter elements 154 will thus cool and move further apart and cease arcing. Thus the starter elements 154 initiate the fluorescent lamps 150 into a run condition automatically when supplied regulated current by the ballast circuit 152 and then automatically return to a substantially inactive state once the fluorescent lamps 154 enter a run condition. The starter elements 154 allow the ballast circuit 152 to provide a lower starting voltage to the fluorescent lamps 150 than the ballast circuit 132 of the embodiment suited for use with fluorescent lamps 130 without integral starters while still facilitating the fluorescent lamps 150 rapidly and automatically entering a run condition. Thus the fluorescent lamps 150 of this embodiment are partially self-regulating and the ballast circuit 152 of this embodiment can dispense with the protection circuit of the ballast circuit 132 of the embodiment suited for use with fluorescent lamps 130 without integral starters. It should be appreciated that the starter elements 154 described herein are simply illustrative of one embodiment and similar function could be provided by alternative devices by one skilled in the art without detracting from the spirit of the present invention.

By employing solid-state devices in the ballast circuit 132 and employing single circuit elements to power multiple fluorescent lamps 130, the portable fluorescent drop-light 100 offers greater economy of manufacture and purchase, smaller size, and lighter weight. By providing a self-oscillation circuit, which is matched in natural frequency that of the load, the ballast circuit 132 employs electrical resonance to create high voltages above line supply within the ballast circuit 132 which automatically starts the fluorescent lamps 130 without any additional user input thus providing additional convenience of use. The portable fluorescent drop-light 100 includes protection circuitry to automatically protect the portable fluorescent drop-light 100 from overdrawing and abnormal load conditions, thereby inhibiting damage to the assembly. The ballast circuit 152 adapted for use with fluorescent lamps 150 with integral starter elements 154 also automatically starts the fluorescent lamps 150 and eliminates bulky components with smaller components and thus maintains the advantageous reduced weight and size of the ballast circuit 132 adapted for use with fluorescent lamps 130 without integral starters.

By providing a switch 114 connected to independently connect the multiple fluorescent lamps 130 to the ballast circuit 132, 152, the portable fluorescent drop-light 100 allows the user to selectively activate single fluorescent lamps 130, 150 separately or together to obtain optimal lighting and economy of energy usage. The portable fluorescent drop-light 100 employs commonly available and inexpensive twin tube 13W fluorescent lamps 130, thereby providing better economy of purchase and less expensive and more convenient replacement of the fluorescent lamps 130 in case they wear out or break.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A hand-held fluorescent lamp assembly comprising:

multiple twin tube PL fluorescent lamps;

multiple switches coupled to the multiple twin tube PL fluorescent lamps respectively, wherein the multiple switches control the multiple PL fluorescent lamps independently;

a ballast circuit configured to generate regulated power, wherein the regulated power is selectively provided to the multiple PL fluorescent lamps by the multiple switches wherein the ballast circuit is a single solid state ballast circuit adapted to provide regulated power to start and operate the multiple twin tube PL fluorescent lamps including multiple twin tube PL lamps with integral starters;

a housing having a first and a second shell that attach together so as to define a gripping surface sized so as to permit the user to hold the lamp assembly and the lamp cavity and wherein the two shells further define a space interior to the gripping surface which is sized to securely receive and retain the ballast circuit and wherein the lamp cavity receives the plurality of multiple twin tube PL fluorescent lamps and wherein the multiple switches are interposed between the gripping surface and the lamp cavity such that the user can activate the switches while holding the gripping surface.

2. The hand-held fluorescent lamp assembly of claim 1, wherein the fluorescent lamps are twin tube bulbs.

3. The hand-held fluorescent lamp assembly of claim 1, wherein the ballast circuit comprises:

a full wave rectifier;

a bi-directional diode; and a pair of transistors that alternately conduct to generate the regulated power.

4. The hand-held fluorescent lamp assembly of claim 1, further comprising a hook configured to hang the hand-held fluorescent lamp assembly from other objects.

5. The hand-held fluorescent lamp assembly of claim 1, wherein the multiple switches are two-pole electrical switches.

6. The hand-held fluorescent lamp assembly of claim 1, further comprising a housing with a handle, wherein the handle encloses a circuit board for mounting and interconnecting components in the ballast circuit.

7. The hand-held fluorescent lamp assembly of claim 6, wherein the multiple switches are interposed between the circuit board and the multiple fluorescent lamps.

* * * * *